United States Patent [19]

Breitschmid

[11] 4,376,737
[45] Mar. 15, 1983

[54] PROCESS FOR THE PRODUCTION OF NAPHTHYLAMINEHYDROXYSULPHONIC ACIDS

[75] Inventor: Hans Breitschmid, Pratteln, Switzerland

[73] Assignee: Ciba-Geigy AG, Basel, Switzerland

[21] Appl. No.: 51,659

[22] Filed: Jun. 25, 1979

Related U.S. Application Data

[63] Continuation of Ser. No. 888,711, Mar. 20, 1978, abandoned.

[30] Foreign Application Priority Data

Mar. 31, 1977 [CH] Switzerland .......................... 4067/77

[51] Int. Cl.³ .......................................... C07C 143/66
[52] U.S. Cl. .................................................. 260/509
[58] Field of Search ........................................ 260/509

[56] References Cited

U.S. PATENT DOCUMENTS

| | | | |
|---|---|---|---|
| 458,286 | 8/1891 | Kuzel | 260/509 |
| 540,412 | 6/1895 | Ulrich et al. | 260/509 |
| 1,573,056 | 2/1926 | Gubelmann et al. | 260/509 |
| 1,670,406 | 5/1928 | Gubelmann et al. | 260/509 |

FOREIGN PATENT DOCUMENTS 550645 12/1957 Canada ............................ 260/512 C Primary Examiner—Joseph E. Evans
Attorney, Agent, or Firm—Joseph G. Kolodny

[57] ABSTRACT

A process for the production of naphthylaminehydroxysulphonic acids which comprises simultaneously combining naphthylaminesulphonic acids containing at least two sulphonic acid groups, or the alkali metal salts thereof, and alkali lyes in the form of highly concentrated aqueous solutions at temperatures between 180° and 240° C. and allowing the resulting reaction mixture to react to completion, such that the time required for the metered addition of the components is not more than twice as long as the subsequent reaction time which is necessary under the chosen reaction conditions, while the water content of the reaction melt is between 0.5 and 20%, based on the total melt.

7 Claims, 1 Drawing Figure

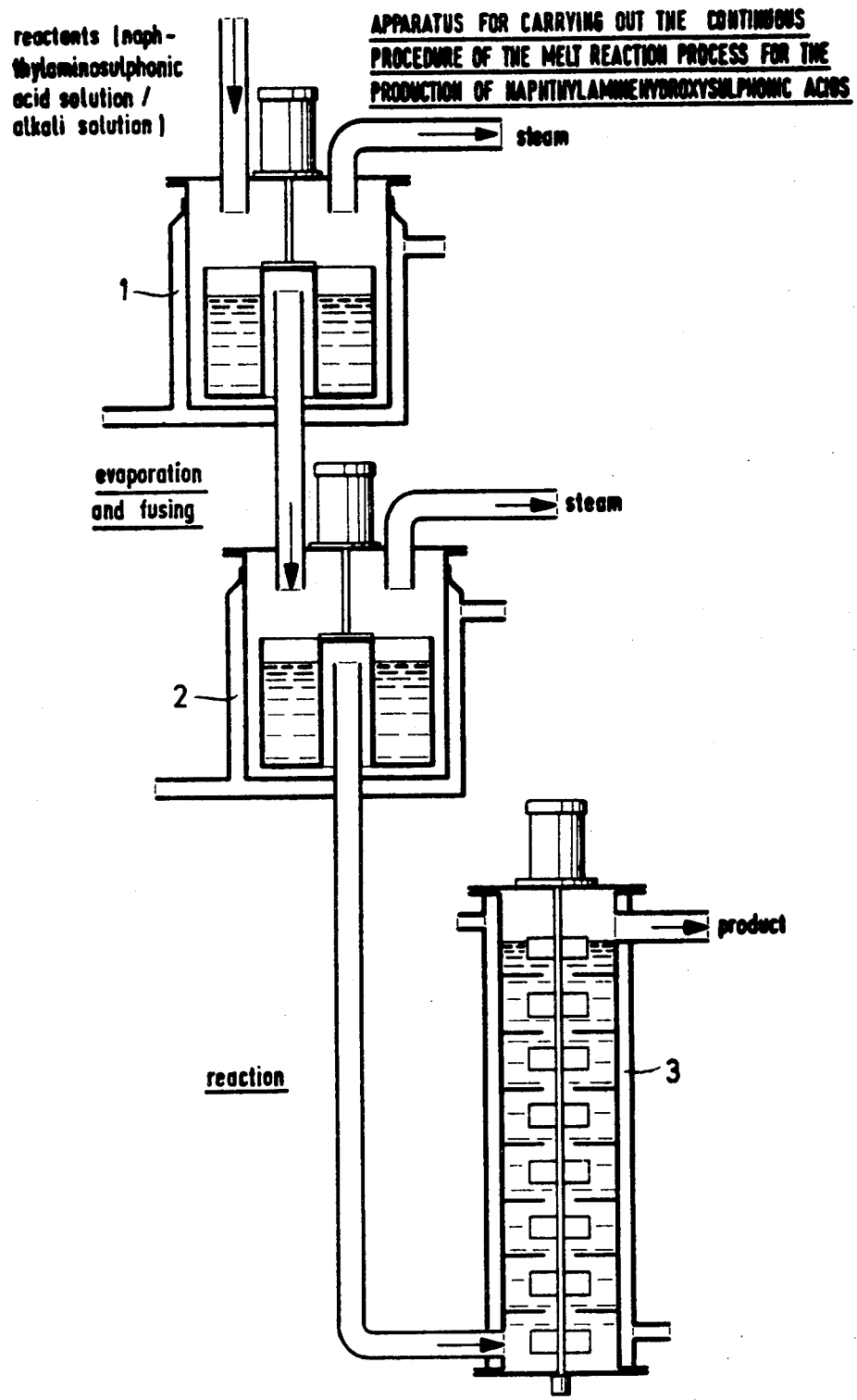

PROCESS FOR THE PRODUCTION OF NAPHTHYLAMINEHYDROXYSULPHONIC ACIDS

This is a continuation of application Ser. No. 888,711 filed Mar. 20, 1978, now abandoned.

The present invention relates to a process for the production of naphthylaminehydroxysulphonic acids from naphthylaminesulphonic acids. In particular, the invention relates to the production of γ-acid (2-naphthylamine-5-hydroxy-6-sulphonic acid) and I-acid (2-naphthylamino-5-hydroxy-7-sulphonic acid).

According to BIOS, DOCS. 1440/1122/H/b/15-16, γ-acid is produced by amidating the potassium salt (potassium 2-naphtholdisulphonate-6,8) in the presence of sulphurous acid and excess ammonia at 185° C. (pressure 22-23 atmos.) and reacting the resulting amino-G solution (potassium 2-naphthylaminedisulphonate-6,8) with sodium hydroxide solution in an open fusion kettle in the melt to give γ-acid.

I-acid is also produced according to BIOS, DOCS. 1440/1122/H/b/18 by reacting amino-I acid (2-naphthylaminedisulphonic acid-5,7) to the melt in an open fusion kettle with sodium hydroxide solution.

In principle, these procedures are reactions in alkali melts in the temperature range of 200° C. Problems during such reactions occur primarily on account of the complicated method involved. The melt changes in consistency in the course of the reaction, resulting in problems in stirring, heat transfer, in foam formation and the formation of incrustations and the like. In order to overcome these problems to some extent, concessions must be made to the efficiency of the process. According to BIOS, about 40 hours—including metering time—are required for example to work up a γ-acid melt. In addition to poor space-time yields, this lengthy reaction time promotes the formation of by-products, which often results in more elaborate purification procedures being required for the desired products.

In addition to the actual reaction itself, secondary reactions which have an adverse effect on the process also occur. For example, a too high water content of the melt promotes the hydrolysis of the amino groups, causes the hydroxylation of sulpho groups whose reaction is not desired, and results in the partial thermal decomposition of the naphthalene skeleton.

On a small scale, it is relatively easy to obtain high yields if uniform optimum reaction times (which are dependent on the chosen temperature) and optimum water contents are maintained. These conditions are product-specific.

However, it has proved extraordinarily difficult to apply these reaction conditions on an industrial scale. For example, the mixing and reaction of fused 100% sodium hydroxide solution with amino-I acid filter cake (about 70%) proceeded so poorly that viscosity and incrustation problems led to the experiments being discontinued. It was also not possible to control the reaction temperature (local overheating).

A further variant comprising the addition of the amino-I acid filter cake to 80% sodium hydroxide solution at 190° C. and subsequent reaction in an open stirred vessel also proceeded badly, with the result that strong foam formation and incrustations impaired the reproducibility of the reaction.

The metered addition of an aqueous, supersaturated solution of amino-I acid (22% water, 116° C.) to 80% sodium hydroxide solution at temperatures of 170° to 210° C. and subsequent reaction also did not achieve the desired aim. At 170° or 180° C. the amino-I acid crystallised as the disodium salt in the reaction mass and did not become fused (unstirrable crystal slurry). Only at 190° to 210° C. did the amino-I acid fuse. The metered addition had to be discontinued prematurely on each occasion on account of strong foam formation.

All these problems led to the search for a novel process which enables the naphthylaminehydroxysulphonic acids to be produced in a simple manner and in the required purity by means of ecologically safe technology and an energy-saving process.

A solution to the problem was surprisingly found by mixing highly concentrated component solutions simultaneously at reaction temperature and allowing the resulting reaction mixture to react to completion. The effect of this method is that only a small amount of water has to be removed from the reaction mixtures, that the reaction mass is at any time in the form of a readily stirrable melt, and that consequently excess water can be removed from the reaction mixture easily and in a short time by evaporation.

The novel process for the production of naphthylaminehydroxysulphonic acids therefore comprises simultaneously combining naphthylaminesulphonic acids containing at least two sulphonic acid groups, or the alkali metal salts thereof, with alkali lyes in the form of highly concentrated aqueous solutions at temperatures between 180° and 240° C. and reacting the resulting reaction mixture to completion, such that the time required for the metered addition is not more than twice as long as the subsequent reaction time which is necessary under the chosen reaction conditions, while the water content of the reaction melt is between 0.5 and 20%, based on the total melt.

Compared with those of known processes, the reaction times are relatively short. In addition to the combining and metering phase, which takes from 0.5 to 4 hours, only 0.5 to 8 hours are required for the total reaction time.

The alkali is used in a distinct excess of the stoichiometric amount, referred to naphthylaminesulphonic acid, namely in the ratio of 4 to 15:1. Suitable alkali lyes are in particular sodium and potassium hydroxide and mixtures thereof.

The reaction can be carried out under pressure or without pressure. If the process is carried out under pressure, then pressures of up to 5 atmospheres are applied. Advantageously, the reaction temperature is between 185° and 215° C.

The process can be carried out continuously or discontinuously. In the discontinuous method, the procedure can be for example as follows: The reactants are used in the form of solutions in as high concentrations as possible and, for technical reasons, at elevated temperatures. The naphthylaminesulphonic acids are converted into the readily soluble alkali metal salts and dissolved with as small an amount of solvent as possible (water) at boiling temperature. The alkali lye is used in the form of a melt or of a 50 to 99% solution. The hot solutions are then fed simultaneously to a small amount of alkali lye in such a manner that the time taken for the metered addition of the total amounts of both solutions is the same. During this addition time, up to 80% of the actual reaction takes place on account of the good physical conditions, i.e. a temperature of about 190° C., and ideal consistency of the melt, which is thus homogeneous and readily stirrable. Only a brief subsequent reaction time is then required to bring the reaction to completion. During the entire reaction time, the water content of the melt must be kept under constant observation. When the reaction is complete, the melt is cooled and diluted with water, then neutralised with acid, preferably sulphuric acid, whereupon the naphthylaminehydroxysulphonic acids precipitate as products. These are filtered off, washed neutral and dried.

In the continuous process, an apparatus such as that illustrated in the attached drawing can for example be used.

The reactants are mixed in the form of highly concentrated aqueous solutions before they are introduced into the apparatus. This mixture is concentrated in the stirred evaporator (1) to the desired water content of the melt by evaporating water and introduced into the stirred evaporator (2), in which a further evaporation of water is effected until the desired specific maximum of the water content of the melt for the respective reactants is reached. From the stirred evaporator (2) the melt passes through the chamber reactor (3), which is so constructed that the sojourn time characteristic ensures an optimum reaction time. The product is continuously discharged, diluted with water and worked up. The reaction temperature in the continuous procedure is between 185° and 230° C., the ratio of naphthylaminesulphonic acid to alkali is between 1:4 to 15, the water content of the melt in the reaction region is between 0.5 and 20%, and the average sojourn time is about 30 to 300 minutes.

In the continuous procedure, the product yields are higher than 80% of theory. The novel process has economic advantages especially on account of the high space-time yields. In particular, however, it is much easier to operate than the previous processes and makes a contribution to hygienic working conditions.

Exemplary of naphthylaminesulphonic acids containing two sulphonic acid groups which can be used as starting materials for the production of the corresponding naphthylaminehydroxysulphonic acids according to the present invention are:

2-naphthylamine-5,7-disulphonic acid,
2-methylaminonaphthalene-5,7-disulphonic acid,
2-naphthylamino-6,8-disulphonic acid,
1-naphthylamine-4,8-disulphonic acid,
2-naphthylamine-3,6,8-trisulphonic acid,
1-naphthylamine-4,6,8-trisulphonic acid.

The naphthylaminehydroxysulphonic acids obtained by the novel process are valuable diazo or coupling components for the production of azo dyes.

The following Examples illustrate the novel process. The parts are by weight.

EXAMPLE 1

Continuous Process 36.2 kg of aqueous and sulphuric amino-I acid filter cake (2-naphthylamine-5,7-disulphonic acid) having an amino-I acid content of 74%, 57 kg of 50% NaOH and 6.8 kg of water, which give a 100 kg starting solution, are concentrated continuously at a throughput of 8 kg/hr in the first stirred evaporator (1) at 185° C. to a water content of 15 to 20%, and fused. The melt is passed into the second stirred evaporator and adjusted by further evaporation to a water content of 8 to 10% at 228° C. Then the reaction is brought to completion in the chamber reactor (3) over an average sojourn time of 70 minutes at 223° C. in the narrowest sojourn time spectrum. The exiting reaction mass, with a water content of 6 to 10%, is continuously charged into water at the reactor outlet. The free I-acid precipitates by adding acid. The precipitate is collected by filtration, washed and, if appropriate, dried.

Yield: 19 kg (90% of theory). The product is pure and can be used in dye synthesis without further purification.

EXAMPLE 2

Discontinuous Procedure 347 g (1 mole) of the disodium salt of 2-naphthylamine-5,7-disulphonic acid are dissolved in 127 g (about 7 moles) of distilled water at boiling temperature. The resulting solution is brown and slightly viscous (solution A). The boiling temperature is about 108° C.

106 g (2 moles) of 75% sodium hydroxide solution are charged at 185° to 190° C. into a 1.5 liter nickel fusion kettle equipped with an anchor agitator close to the sides (solution B). With stirring, solution A and 213 g (4 moles) of 75% sodium hydroxide solution (150° C.) are simultaneously run into solution B at 186° to 190° C. in the course of 3½ to 4 hours via a metering control system. During the metered addition, water evaporates over a descending cooler. When the addition is complete, the batch is allowed to continue to react for a further 3½ to 4 hours at 190° C. The reaction mass is then cooled to 160° C., the reaction vessel closed, and 360 g (20 moles) of water are forced in, whereupon the pressure rises slightly to about 1 atmosphere. During the addition of water, cooling is continued to 90° C.

The product is precipitated from the dilute reaction mass with sulphuric acid. Yield: 212 to 218 g of I-acid (88.5 to 91% of theory).

EXAMPLE 3

The N-methyl-I acid (2-methylamino-7-sulphonic acid) is obtained in similarly good yield by using, instead of amino-I acid, equivalent amounts of the disodium salt of N-methyl-amino-I acid (disodium 2-methylaminonaphthalene-5,7-disulphonate), and repeating the procedure described in Example 1 or 2 using a mixture of sodium and potassium hydroxide (1:1).

EXAMPLE 4

With stirring, a neutral solution of 380 g (1 mole) of the dipotassium salt of amino-G acid (dipotassium 2-naphthylaminedisulphonate-6,8), having a water content of about 35%, and 160 g (4 moles) of 100% sodium hydroxide, as 75% aqueous solution, are simultaneously combined and fed into an open 1.5 liter nickel pressure reactor over the course of 3½ to 4 hours. The reactor contains 80 g (2 moles) of 100% sodium hydroxide as 75% aqueous solution having a temperature of 195° C. The supply of heat and the metering are so controlled that the temperature of 195° C.±is kept during the entire addition time. The water which is distilled off is measured quantitatively. The reaction vessel is closed as soon as the water content of the melt is 15 to 17%. If the metering is still not complete, the water not yet added must also be taken into account. When the metering is complete and the water content reached, the reaction vessel is closed and the reaction mixture is heated to 215° to 220° C. and allowed to continue to react for a further 2 hours. The pressure is 2.5 to 3.5 bar. When the reaction is complete, the batch is cooled to 165° C., 325 g (18 moles) of water are formed in (including rinsing water) and cooling is continued to 90° to 95° C. The dilute reaction mass is worked up with sulphuric acid.

Yield: 218 g of γ-acid (91% of theory).

EXAMPLE 5

383 g (1 mole) of 2-naphthylamine-3,6,8-trisulphonic acid are neutralised with 400 g (3 moles) of 30% sodium hydroxide solution and then simultaneously combined with 320 g (6 moles) of 75% sodium hydroxide solution and fed into a nickel reactor which contains 213 g (4 moles) of 75% sodium hydroxide solution. The metered addition is made while controlling the temperature at 185°–190° C.

The evaporated water is condensed and drawn off. When the metering is complete, the batch is allowed to continue to react for 3 hours at 190° C., cooled to 170° C. and diluted with 500 g of ice-water.

The resulting 2-naphthylamine-8-hydroxy-3,6-disulphonic acid is subsequently precipitated from the dilute reaction mass with a hydrochloric acid/sulphuric acid mixture and isolated.

Yield: 239 g (73% of theory) of 2-naphthylamine-8-hydroxy-3,6-disulphonic acid (RR-acid).

EXAMPLES 6 AND 7

The products listed in column 3 of the following table are obtained by repeating the procedure described in Example 4 or 5, using corresponding amounts of the sulphonic acids listed in column 1.

TABLE

| 1 Reactants | 2 | 3 Product | 4 Yield % |
|---|---|---|---|
| 6 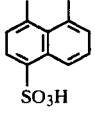 | NaOH | 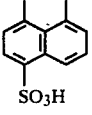 | 88 |
| 7  | NaOH |  | 89 |

What is claimed is:

1. A process for the production of naphthylaminehydroxysulphonic acids which essentially comprises simultaneously combining naphthylaminesulphonic acids containing at least two sulphonic acid groups, or the alkali metal salts thereof, and alkali lyes in the form of highly concentrated aqueous solutions at temperatures between 180° and 240° C. and allowing the resulting reaction mixture to react to completion under atmospheric pressure, such that the time required for the metered addition of the components is not more than twice as long as the subsequent reaction time which is necessary under the chosen reaction conditions, while the water content of the reaction melt is between 0.5 and 20%, based on the total melt.

2. A process as claimed in claim 1, wherein the alkali is used in an excess of 4 to 15 times the stoichiometric amount, based on naphthylaminesulphonic acid.

3. A process as claimed in claim 1, wherein a continuous or discontinuous procedure is employed.

4. A process as claimed in claim 1, wherein naphthylamine-di- or -trisulphonic acids are reacted with alkali lyes.

5. A process as claimed in claim 1 for the production of the I-acid (2-naphthylamine-5-hydroxy-7-sulphonic acid) and the γ-acid (2-naphthylamine-8-hydroxy-6-sulphonic acid) starting from 2-naphthylamine-5,7-disulphonic acid and the dipotassium salt of 2-naphthylamine 6,8-disulphonic acid respectively.

6. A process as claimed in claim 1 for the production of the N-methyl-I acid (2-methylamino-5-naphthol-7-sulphonic acid) starting from 2-methylaminonaphthalene-5,7-disulphonic acid.

7. A process as claimed in claim 1 for the production of 2-amino-8-hydroxynaphthalene-3,6-disulphonic acid and 1-amino-8-hydroxynaphthalene-4,6-disulphonic acid starting from 2-naphthylamine-3,6,8-trisulphonic acid and 1-naphthylamine-4,6,8-trisulphonic acid respectively.

* * * * *